Patented Sept. 1, 1953

2,650,558

UNITED STATES PATENT OFFICE 2,650,558

TRANSPORTING FLOAT

André Raymond Marie Nizery, Paris, France, assignor to Centre National de la Recherche Scientifique, Paris, France, a corporation of France Application April 22, 1949, Serial No. 88,931
In France April 30, 1948

4 Claims. (Cl. 114—0.5)

The present invention relates to a method and a device for transporting and handling loads at sea, e. g. for transporting and laying concrete blocks and pipes.

It is known that the solution of such problems, in particular that of the transport and laying of large diameter pipes at sea, is very difficult because of the existence of swell.

The main object of the present invention is to provide very simple means whereby the effect of swell is rendered negligible during transport and laying.

A suitable stable floating structure or vessel for this purpose is one having a negligible response to wave motion, comprising two submerged buoyant bodies, which are horizontally arranged, and spaced apart parallel with each other at the same level. From each of these bodies a plurality of vertically arranged buoyant bodies extend upwardly to above the surface of the sea. The upper ends of the vertical bodies are interconnected by a bridgework or the like to form a rigid structure, and their lower ends blank sufficient of the upper surfaces of the submerged bodies that the changes of heads of pressure on the upper and lower surfaces thereof due to sub-surface waves balance, or substantially balance one another.

Applicant has found, however, that a particularly simple and satisfactory structure is obtained when the submerged bodies are adapted to give buoyancy to not substantially less than 90% of the load and when the bodies which extend above the surface of the sea are adapted to give buoyancy to the remaining portion of the load.

According to the invention, an apparatus for transporting and handling a load at sea comprises a first buoyant body adapted to give buoyancy to not substantially less than 90% of the load, the said first body being, in operation, entirely submerged in the water; and at least one additional buoyant body, adapted to give buoyancy to the remaining portion of the load, the said additional body or bodies having a small horizontal cross-sectional area and being, in operation, at least partially submerged in the water.

In operation, the load is submerged to a depth where the movement of the water is sufficiently reduced, and is suspended from a float having essentially the following characteristic features:

1. The float is constituted by two buoyant portions: the first is sufficiently submerged not to lift off the water due to the oscillations of swell; it counterbalances 90% of the load. The second, which provides the required additional buoyancy, has a small horizontal cross-section.

The variations of the hydrostatic thrust upon the whole assembly are small enough with respect to the applied load to reduce the vertical oscillations of the whole assembly to a considerable extent, in spite of the dynamic thrusts exerted upon the first buoyant portion.

2. The transverse stability of the float assembly is ensured by the fact that:

(a) The second buoyant portion is divided up into several sections sufficiently spaced apart from each other in the horizontal plane.

(b) The suspension point of the load is located below the lower buoyant portion.

3. The suspension point of the load is constituted by a hawse-hole through which the hoisting cable, actuated by a winch located on an upper stage, can slide.

4. If the load does not have an area sufficient to oppose its displacement in water under the effect of the hydrostatic buoyancy upon the float, the said load is supplemented by horizontal dampening plates of suitable dimensions.

5. The float according to the invention has a comparatively shallow draught, which makes it adapted to usual operations.

A device according to the invention, diagrammatically shown in the accompanying drawings will be now described as an illustrative embodiment.

The float is provided with a lower buoyant portion constituted by two horizontal cylinders 1 interconnected by a metal framework. On each cylinder are disposed two vertical cylindrical air-tanks 2 having a height materially greater than the maximum swell amplitude in the area where the float is to be used. When the float is light, the water-line is about at the level of the diametral plane of cylinders 1; when it is under load the water-line in still waters is located above the lower end of air-tanks 2 by a distance at least equal to half the maximum amplitude of swell. Thus the oscillation of the water-line in swelling sea affects only air-tanks 2, and cylinders 1 never emerge from the water.

The framework interconnecting the cylinders 1 is extended downwards by an appendix 3 which carries a hawse-hole 4 through which the hoisting cable passes. The application point of the load is thus low enough to ensure the stability and equilibrium of the whole assembly.

Figure 1:
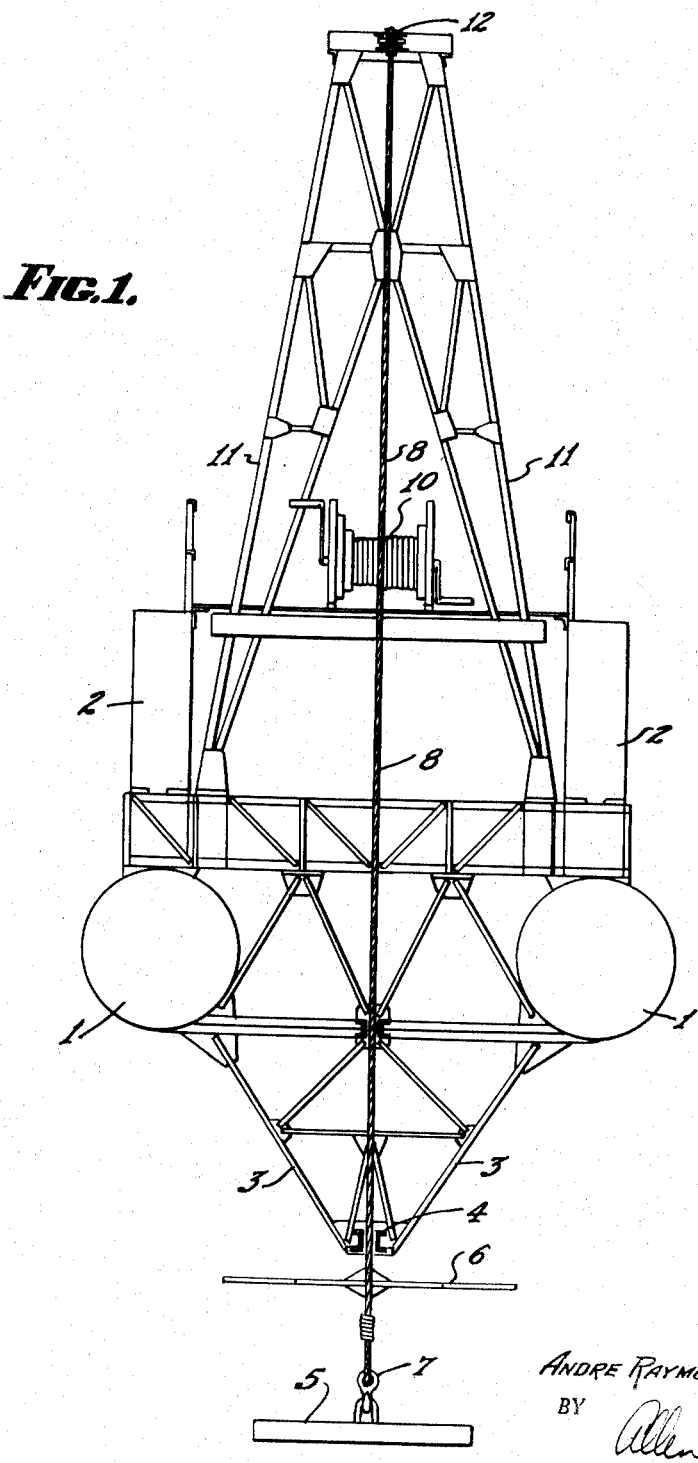
Figure 1 is a diagrammatic end elevational view of the device.
Figure 2:
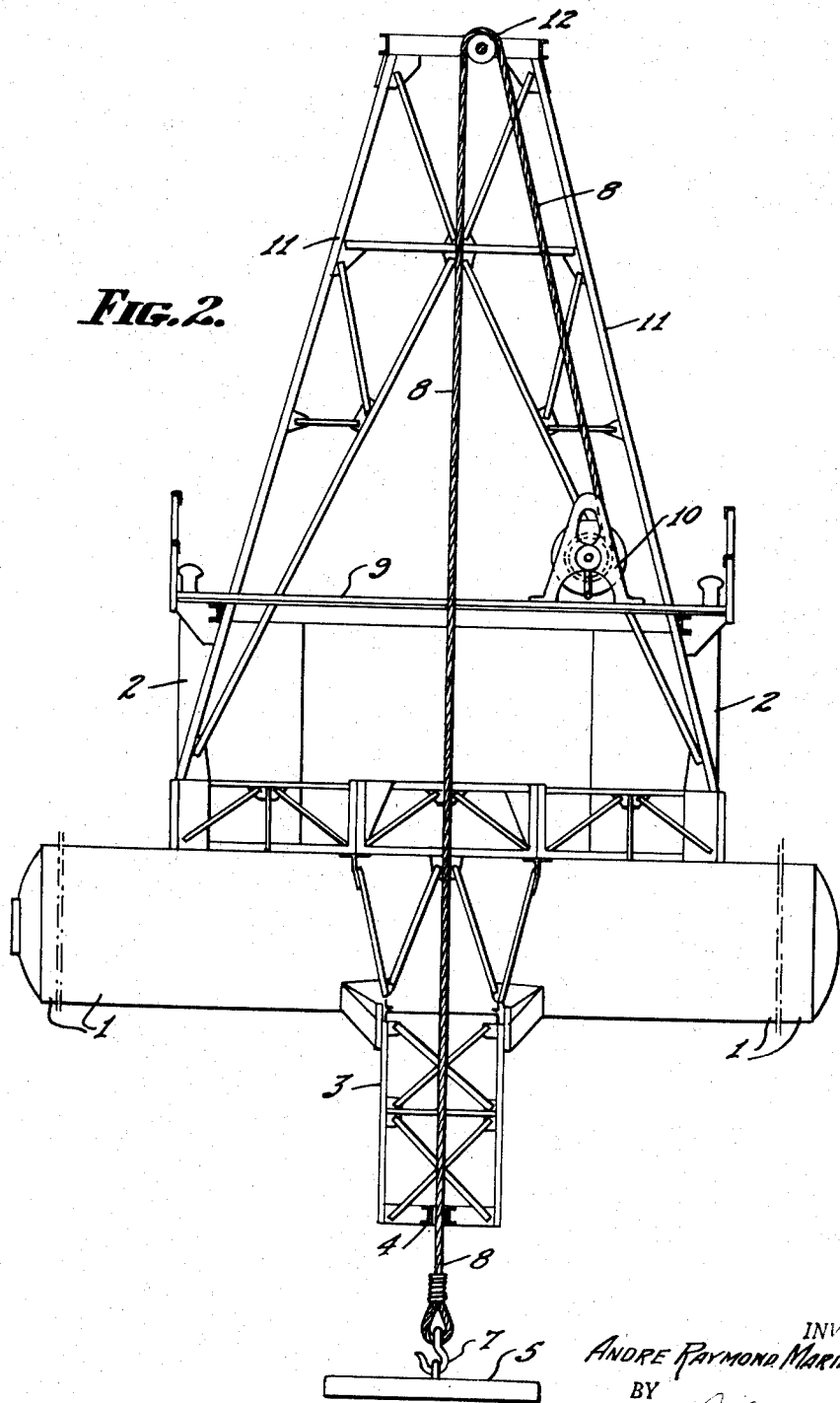
Figure 2 is a diagrammatic side elevational view.
Figure 3:
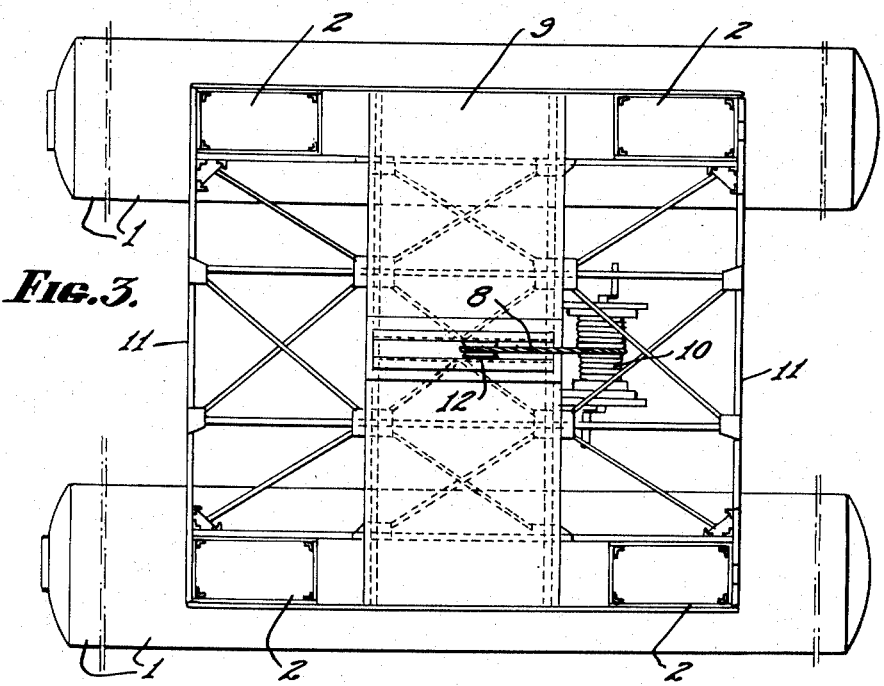
Figure 3 is a diagrammatic plan view, the tower being not shown.
Figure 4:
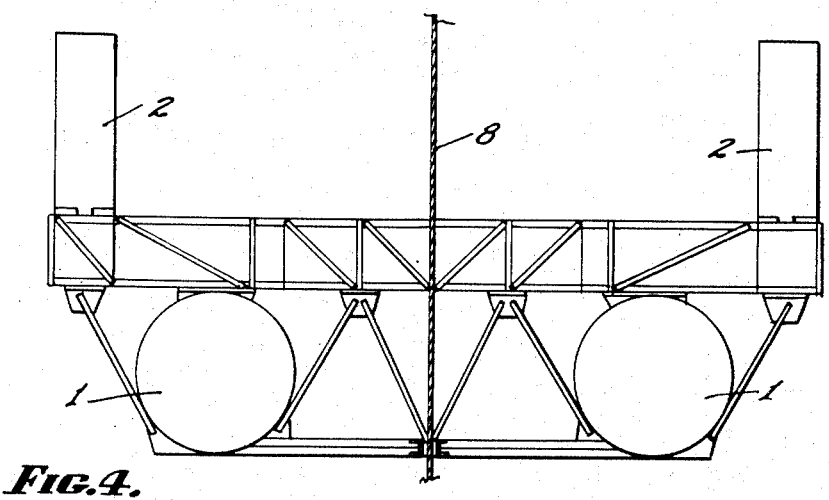
Figure 4 is a fragmentary end elevational view of a modification of the device.

It is to be noted that if the float is to be used in shallow waters it is possible to omit this appendix and to locate the hawse-hole at the level of the lower generatrices of the cylinders 1; it is then sufficient to ensure the stability and equilibrium of the float to increase the longitudinal and transverse inertia moments of the buoyancy by increasing the distance between air-tanks 2. It is possible, e. g. on the one hand, to displace the said air-tanks towards the ends of the cylinders and, on the other hand, to space the cylinders apart from one another or to space apart the air-tanks only in the transverse direction by supporting them by a cantilever framework. This modification is illustrated in Figure 4.

For further damping of possible motions of the load 5 a damping disc 6 may be located just above the suspension hook 7 of load 5 on cable 8.

At the upper part of air-tanks 2 there is secured a handling stage 9 which accommodates the hoisting cable 8. The said stage carries a hoisting-winch 10 and a tower 11 supporting a pulley 12 over which the hoisting cable 8 runs. Suitable tackle-blocks, not shown in the accompanying drawings, may obviously be used to facilitate the operation of the winch.

What I claim is:

1. A device for transporting and handling a load at sea, comprising a first buoyant body constituted by two elongated, horizontally disposed, cylindrical members secured together in spaced relation, and an additional buoyant body secured to each of said members adjacent each end thereof, said additional buoyant bodies being elongated in one dimension, having a relatively small cross-sectional area with respect to said members, and positioned on top of said members with their elongated dimension in a vertical position, said device having a mass, such that, in operation, the entire first buoyant body, and a part at least, of said additional buoyant bodies, is submerged in the water, the ratio of the masses of said first and additional buoyant bodies being such that at least substantially 90% of the buoyancy of the device is provided by said first buoyant body.

2. A device according to claim 1, having suspension means extending therebeneath to which a load may be secured.

3. A device according to claim 2, said suspension means including a cable to which a load may be secured, and guiding means rigidly secured to said device and generally centrally thereof through which said cable passes, said guiding means being positioned at a depth at least as great as the bottom of said members.

4. A device according to claim 2, wherein, a stabilizing plate is secured to said cable below said guiding means.

ANDRÉ RAYMOND MARIE NIZERY.

References Cited in the file of this patent

UNITED STATES PATENTS

| Number | Name | Date |
| --- | --- | --- |
| 162,531 | Clark et al. | Apr. 27, 1875 |
| 513,855 | Zertuche | Jan. 30, 1894 |
| 513,856 | Zertuche | Jan. 30, 1894 |
| 646,331 | Turc | Mar. 27, 1900 |
| 1,220,825 | Funga-Giera | Mar. 27, 1917 |
| 1,312,356 | Reid | Aug. 5, 1919 |
| 1,470,459 | Lonsinger | Oct. 9, 1923 |
| 1,840,324 | Lindquist | Jan. 12, 1932 |
| 2,375,286 | Creed | May 8, 1945 |

FOREIGN PATENTS

| Number | Country | Date |
| --- | --- | --- |
| 8,101 | Great Britain | May 23, 1912 |
| 572,005 | Germany | Mar. 9, 1933 |